US010155587B1

(12) United States Patent
Tang

(10) Patent No.: US 10,155,587 B1
(45) Date of Patent: Dec. 18, 2018

(54) UNMANNED AERIAL VEHICLE SYSTEM AND METHOD FOR USE

(71) Applicant: Rujing Tang, Plano, TX (US)

(72) Inventor: Rujing Tang, Plano, TX (US)

(73) Assignee: Rujing Tang, Plano, TX (US)

( * ) Notice: Subject to any disclaimer, the term of this patent is extended or adjusted under 35 U.S.C. 154(b) by 96 days.

(21) Appl. No.: 15/041,815

(22) Filed: Feb. 11, 2016

Related U.S. Application Data

(60) Provisional application No. 62/232,542, filed on Sep. 25, 2015, provisional application No. 62/238,919, filed on Oct. 8, 2015, provisional application No. 62/262,895, filed on Dec. 3, 2015.

(51) Int. Cl.
*B64C 39/02* (2006.01)
*B64C 27/08* (2006.01)
*G05D 1/00* (2006.01)
*B64D 47/02* (2006.01)
*B64D 47/08* (2006.01)

(52) U.S. Cl.
CPC ............ *B64C 39/024* (2013.01); *B64C 27/08* (2013.01); *B64D 47/02* (2013.01); *B64D 47/08* (2013.01); *G05D 1/0011* (2013.01)

(58) Field of Classification Search
CPC ....... B64C 39/024; B64C 27/08; B64C 39/02; B64C 2201/12; B64C 2201/121; B64C 2201/128; B64D 47/02; B64D 47/08; G05D 1/0011; B64F 1/02; B64F 1/32
USPC .................................... 244/17.13, 4 A, 17.11
See application file for complete search history.

(56) References Cited

U.S. PATENT DOCUMENTS

| | | | |
|---|---|---|---|
| 9,085,362 B1 * | 7/2015 | Kilian ........................ | B64F 1/02 |
| 9,459,620 B1 * | 10/2016 | Schaffalitzky ....... | G05D 1/0016 |
| 9,527,604 B2 * | 12/2016 | Melish .................... | B64F 1/025 |
| 9,739,870 B1 * | 8/2017 | Beckman ................. | G01S 5/16 |
| 2011/0064022 A1 * | 3/2011 | Curtin ............... | H04L 29/12254 370/328 |
| 2015/0346722 A1 * | 12/2015 | Herz .................... | G05D 1/0038 701/2 |
| 2016/0364989 A1 * | 12/2016 | Speasl .................. | G08G 5/0034 |
| 2017/0006417 A1 * | 1/2017 | Canoy .................. | H04L 63/126 |
| 2017/0129605 A1 * | 5/2017 | Wu .......................... | B64D 1/18 |
| 2017/0197718 A1 * | 7/2017 | Buchmueller ........... | B64D 1/22 |

\* cited by examiner

*Primary Examiner* — William V Gilbert

(57) ABSTRACT

A system includes an unmanned aerial vehicle having a body with a hollow cavity, a plurality of rotary assemblies secured to the body and configured to provide lift, a control system disposed within the hollow cavity, a deterrent device secured to the body, a remote communication device operably associated with the control system. The method includes providing tracking location of a user upon activation of the remote control device, autonomously flying the unmanned aerial vehicle to a location of the remote communication device, and delivering a payload.

17 Claims, 18 Drawing Sheets

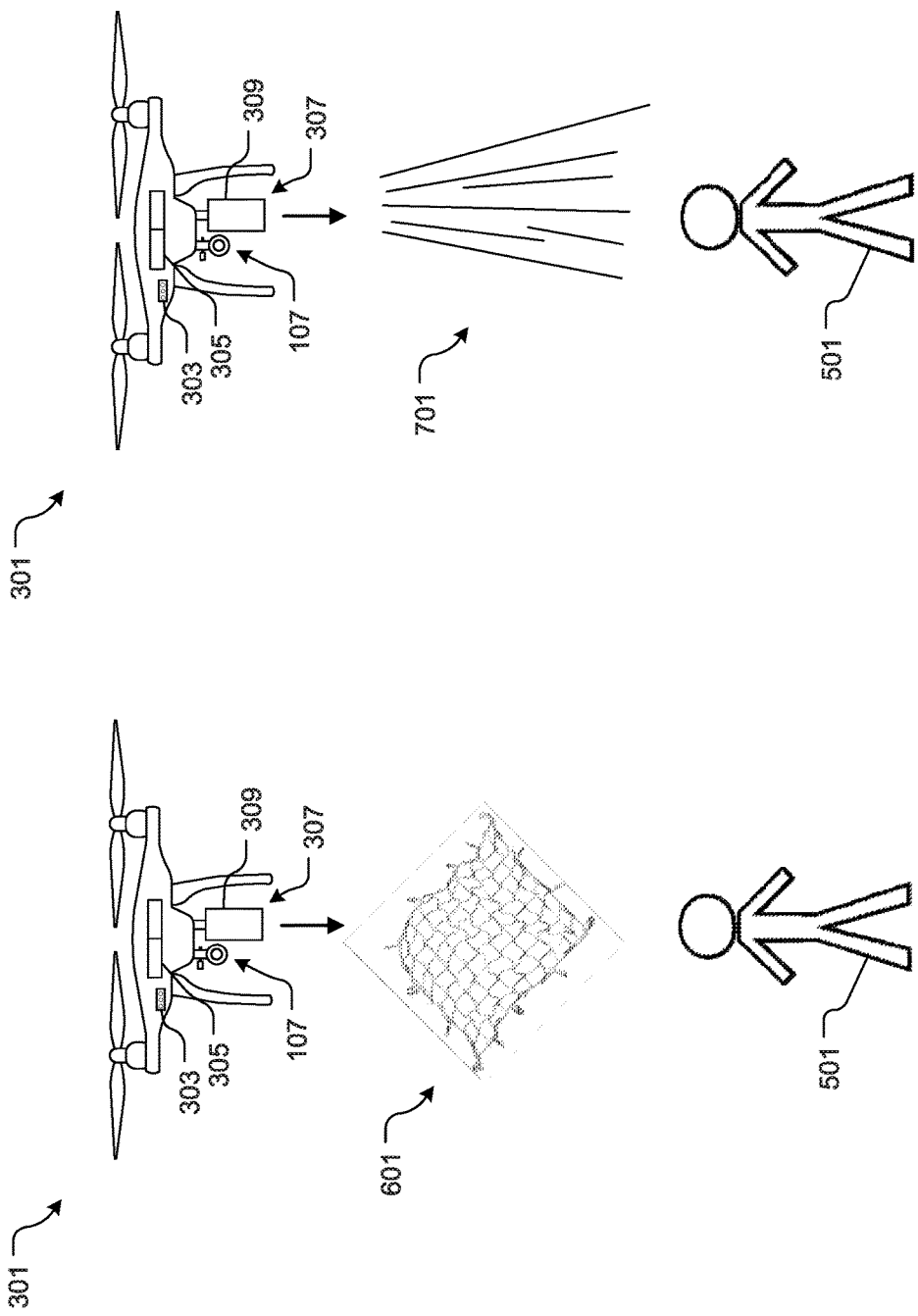

UNMANNED AERIAL VEHICLE SYSTEM AND METHOD FOR USE

BACKGROUND

1. Field of the Invention

The present invention relates generally to aircrafts, and more specifically, to an unmanned aerial vehicle (UAV) system and method of use.

2. Description of Related Art

UAVs are well known in the art and are effective means for leisure activities, and in some uses, as working aerial aircraft. It should be appreciated that advances in technology has increased the usage of UAVs. For example, FIGS. 1 and 2 illustrate respective front and top views of a UAV 101 that could be used for video capturing. The UAV 101 includes a body 103 with a plurality of legs 105a, 105b secured thereto and a video device 107 attached to a lower surface of body 103 and configured to capture video while the UAV 101 is in flight. To achieve flight, a plurality of propulsion rotary devices are utilized, e.g., devices 109a, 109b, 109c, and 109d.

One of the disadvantages of UAV 101 is the limited use. For example, the UAV 101 is adapted to merely capture video, which in turn is conveyed to the user. It should be understood that the UAV provides little to no assistance against an assailant. Further, the UAV does not provide means wherein multiple parties can view the images captured on the video device and/or provide means for the user to view selected designations upon demand.

Accordingly, although great strides have been made in the area of UAV technology, many improvements remain.

BRIEF SUMMARY OF THE INVENTION

In one embodiment, the present invention comprises at a least one notification device, at least one unmanned aerial vehicle (UAV) platform and at least one command center. In the text, the term 'Command Center' and 'Command Station' are used interchangeably. The UAV is sometimes referred as 'drone'. A typical UAV platform may carry any combination of the following: a non-lethal weapon system, a loudspeaker, a flashing light, a microphone, a video camera, and a communication and control module.

In some embodiments, there could also be a video screen on the UAV to display video images. The notification device could be a software app on a general-purpose mobile device such as a mobile phone, or a dedicated wearable device. In addition, the nonfiction device could incorporate sensors that can communicate with the drone directly or indirectly. The command center is responsible for communicating with the UAVs, the user and the public safety authority. It is also responsible for UAV's actions. The command center function could be carried out by software or human beings, or a combination of both. In certain instances, the public safety authority might be operating a command center.

It will be appreciated, that the system of UAV emergency defender covers a geographic area called service area. Any user with the emergency notification device within the service area would be able to use the service provided by the system. A number of networked UAVs are strategically located at different locations; and are able to cover a service area to ensure timely response within a prescribed time after an emergency signal is received. The UAVs could be housed in an enclosure at building roofs, power pole tops and vehicles. When the dispatch command comes in the UAV's enclosure opens for free flight of the UAV.

During use, the user may activate the notification device whenever he or she feels threatened by an imminent attack. The emergency signal is sent along with the GPS location of the user to the UAV directly or indirectly through a wireless communication network. For instance, the emergency signal and the GPS location info could be sent via an existing cellular wireless communication network and received by the command center. The command center is able to communicate this information to a public safety agency through standard 911 emergency call procedures or a similar protocol. At the same time, the command center determines which UAVs are going to attend to this situation. Once a UAV or multiple UAVs have been selected from one or more cells, a flight command is sent to the UAVs to carry out the flight and response mission.

Upon receiving this information, the UAVs are dispatched by the command center to fly over to the location indicated by the GPS signals. The UAV would sound an alarm, flash its lights to attract attention with the intent on scaring off the attacker. At the same time, the UAV starts voice communication with the attacker. The attacker or would-be attacker is now the target of the UAVs. The flashing light could be similar to police's red and blue alert light, and the sound played by the onboard speaker could be siren and warning messages to urge the target to abandon the offense. At the same time, the UAV is video recording the situation and transmitting the video in real time to a police station or the command center. The staff at the police station or the command center would monitor the situation and communicate with the people at the scene through the loudspeaker onboard the UAV, as well as the video screen carried by the UAV.

The arrival of the UAVs, the video and audio recording, the voice and video communicating with the parties could be expected to scare off the attacker. The information recorded could be further used as clues for capturing the attacker, as well as evidence in the justice system.

When the UAV arrives at the proximity of the user who sent out the SOS and the GPS location information, the UAV would start sending siren sound and voice communications via the speaker installed on the UAV. The video camera onboard the UAV is also taking real time video shots of the scene. A microphone on the UAV records the sound around the scene as well. The video images and the sound are sent wirelessly to the command center.

In addition, if necessary, the UAV could deploy the non-lethal weapon upon the target and neutralize it. The deployment could be controlled remotely by the command center, by the user or by the drone autonomously. The video camera could identify the exact location of the target. The non-lethal weapon could be aimed at the target based on this location information.

There are multiple other ways to aim at the target. One such method is to let the command center remotely control the deployment, because the command enter has the real time video image of the offender using first person view (FPV). By aligning the deployment direction with the video images, the command center or the software of the UAV is able to aim at the target and deploy the non-lethal weapon. Further, the user may have a screen display either on a mobile device or the notification device that shows the FPV from the viewpoint of the UAV. The user is able to direct the UAV using the FPV to aim at the target.

Another way is to let the user point at the offender and use image processing software to identify the target. Since the user has a communicating emergency notification device, the UAV is aware who and where the user is. If the user uses a pointing object such as his or her finger or arm at the target, the UAV's video camera is able to capture the pointing image. By extending a line in the direction of the pointing, the image processing software is able to identify the target by the fact that the target is a human being. The UAV's camera takes multiple pictures at different angles by virtual of relative movement between the UAV and the user. More advanced sensing technologies could be used by the UAVs, such as thermal imaging. The pointing line could look different in different pictures, but they all end with the target. The algorithm for figuring out where the target is based on the fact that all the pointing directions from different pictures end in the target, therefore the target as well as its location could be identified with a good hit rate.

Yet another way is to let the user project a beam of light onto the target, such as a laser. The reflection of the laser is captured by the UAV and thereby the target is identified.

The system may comprise multiple UAVs. For speedy arrival time, each UAV is positioned strategically with appropriate spacing between each other. The goal is to ensure the distance between random locations inside the service area between the closest UAV is within a predetermined distance. In this way, at least one UAV could arrive within prescribed time period no matter where the user is located within the service area.

In addition, multiple UAV could be dispatched in response to the same emergency response request. The swarm strategy of employing multiple UAVs could enhance the effectiveness defending the user.

The UAV may carry a payload of immobilization device, such as a net, a vehicle immobilization device such as tire spike, lubricant spray, chemicals such as pepper spray, a device that sends sound blast, or dazzling light, stun guns such as Taser gun, and other non-lethal weapons. A controller is able to deploy the non-lethal weapon upon the target. The controller might be the staff at the command center, public safety authority or the user himself.

In one of the primary embodiments, a UAV has a payload of a net. The net is made of material strong enough to trap a person or a moving target object such as an animal, or another airborne object such as an unfriendly UAV or an unfriendly aircraft. The net would be released from the UAV and extended to descend onto the target. The net would entangle the target's legs or other mobile parts to disable their movements, thereby immobilizing the target. Coating could be applied to the surface of the net. The coating may add stickiness to the net which makes it much harder to get rid of the net once in contact. Another example for the choice of the coating is that the selected coating could leave colors or other tracing materials on the target. The tracing is hard to remove from the target's clothes or body and therefore helps the police to apprehend the target in the future. For instance, the coating could be glue being mixed with dye color.

The net could be deployed from the UAV by different mechanical designs. One way is to project the net outward by pushing out weights secured to the edges of the net. The weights could be pushed by loaded spring. Another way to push out the weights out is to use compressed gas. The compressed gas expands in a chamber upon being released from a compressed gas canister. The expansion force pushes out the weights, which extends the net outward.

The weights are projected at angles in such a way that the net is extended to its fullest upon arriving at the target.

A net is an excellent immobilization device for most airborne object, such as aircraft, or another unfriendly UAV. Upon in contact with the moving parts such as rotary propellers or a jet turbine of that airborne object, the net would entangle that moving parts and cause damage or failure of the airborne object. The change of aerodynamic characteristics once the net is in contact with the target would also contribute to the object's inability of maintaining airborne.

A net is also quite effective in stopping a moving human or animal. The net would trap, confuse, and entangle legs and ultimately stop that moving human or animal.

In another embodiment, the UAV may carry a high voltage contact stun gun such as a Taser gun. The stun gun is triggered remotely to project thin wires onto a target. The thin wires pass high voltage electrical current to the body of the target which results in neutralizing the target.

In one embodiment, the net could be carried by a single UAV, and released or deployed from above the target. In another embodiment, the net could be projected in a direction other than downward. For instance, the net would be sprung upward to entangle an airborne object above the UAV. In yet another embodiment, the net could be carried by multiple UAVs, and each UAV flies in concert with respect to the other UAVs. This 'flying net' could be controlled remotely to access the target and effectuate an engagement. Further the multiple UAVs could be carried by an aircraft or another UAV ('mother UAV') before the multiple UAVs fly by their own. The multiple UAVs are released from the aircraft or the 'mother UAV' remotely when the timing is ready for deploying the immobilizing device.

In yet another embodiment, the UAV might carry chemical substances which may cause the target to lose the ability of carrying out intentional attacks. Some of the examples of such chemical substance are known as riot control agent or RCA. The deployment options are many. For instance, the UAV may drop of project pallets of incapacitating chemical substances in compacted powder form at the target. Once the compacted powder pallets impact on ground or the target the pallet disintegrate and the power would propagate in the air, causing contact with the target's body. Another design is to employ a projecting mechanism to project outward a ball shaped projectile. The shell of the ball is made of some material such as plastic or paper that would crack open upon impacting. Inside the shell is an incapacitating chemical substance in powder form or liquid form. By contacting the chemical substance, the target may lose the ability of comminuting the attack.

For stopping a moving vehicle, a human, an animal or other types of targets, the payload of the UAV could be tire spikes or caltrop. The UAV deploys the payload of tire spikes in front of the vehicle. The tire spikes would pierce the vehicle's tires and cause it to stop eventually. Similarly if the caltrops are of appropriate sizes and deployed around a human target, it could prevent that target to run or walk outside the deployed caltrops. The UAV could project these caltrops out using simple projecting mechanisms, or the UAV could simply drop the caltrops from a storage bin.

Another substance that could prevent an object from moving is lubricant or anti traction materials. The UAV carries a container of lubricant such as oil, grease or some other specially formulated lubricant. The UAV may spray the lubricant around a target so that the target is not able to move on the surface, which is covered by the lubricant due to drastically lowered surface friction.

The emergency notification device could be implemented as a dedicated device consisting of its own hardware and software. Alternatively the emergency notification device could be a mobile app that runs on a general-purpose mobile device like a smart mobile phone. In both embodiments, a GPS receiver is present and is able to supply the device with current location information in the form of longitudinal, latitude and elevation coordinates.

In the case of being implemented as a dedicated device consisting of hardware and software, the device is typically designed to be wearable for a user to carry around. In one embodiment of the emergency device, it has a button that the user presses in emergency. In another embodiment of the emergency device, voice recognition software could be used to activate the emergency notification function. The software is able to detect the words or phrases spoken by the user, such as 'HELP', or 'Drone Bodyguard Activation'.

Another method to activate the emergency notification device is to embed various sensors within it. For instance, vital sign monitoring sensors could detect abnormal blood oxygen level; an accelerometer or a group of wearable accelerometers could be used to detect unusual patterns of body movements; a combination of heart rate sensor, skin conductivity sensor, blood flow sensor and temperature sensors could be used to detect stress level. By incorporating statistics, the wearer of the emergency notification device could be found at immediate danger, which would automatically activate the emergency notification device.

Once the emergency notification device is activated, a communicating link is established between the device and the command center. The emergency device sends out the 'SOS' signal along with the current GPS location to the command center. The command center receives the rescue request and enters into rescuing mode.

The command center notifies a public safety agency through standard 911 call process or some protocols. The command center sends the public safety agency the location and the request for help. At the same time, the command center selects the closest UAVs to the location of the emergency notification device. A dispatch order is sent to these UAVs after such selection.

The UAVs use the GPS location of the emergency notification device as waypoint to guide them to fly over the target location. The UAV is aware of its altitude through the use of GPS signals as well as altitude sensor. It keeps a safe distance above the ground so that it is able to carry out its tasks without being interfered by the target.

The video camera and the microphone on the UAV are turned on once the UAV is in the air. The real time video and audio are streamed back to the command center, which could also be relayed to the public safety agencies. The video and audio are used for evidence collection for future investigation and prosecution, and are also used for real time intervention. Furthermore, the video images and other information gathered from the scene could be utilized to devise very tailored strategies for that particular target. For example, the images of the target's face could be linked to a server to find a match. Other identification methods could also be used to find relevant information about the target while the target is still at the scene. The voice communication through the onboard UAV could address the target name and his/her psychology to persuade him to give up effort. The police could potentially arrive at the potential hideout places even before the target arrives from the scene, such as the target's home.

The staff at the command center or the personnel at the public safety agency could manually guide the flight of the UAVs as well. Upon approaching the target, the speaker on the UAV plays siren sound and voices communications from the command center. The voice command would demand the target to cease the offense. It also could give guidance to the user on what to do next.

The red and blue LED lights would be flashing to attract attention and mimic a police presence.

Conceivably the target would be scared off at this point. If the target does not stop perpetrating, an authorized personnel at the command center or the public safety agency or the user could activate the immobilization tool onboard the UAVs. These types of tools are designed to temporarily incapacitate the target and stop them from harming other people until the police's arrival. Alternatively the user could activate the immobilization device within the purview of applicable laws.

In yet another embodiment, a plurality of UAVs are utilized to cover an overall area. Each UAV is equipped with situational information acquisition apparatus such as video camera, microphone, air pressure sensor and other sensors. Each UAV is controllable in its motion and information acquisition wirelessly and remotely. One or more such UAV may form a network to cover an area or areas. A command center is used to control and communicate with these UAVs. The command center also sends acquired information to a network of subscribers who can access the information with computing device through computer network such as the Internet. Further, a subscriber is able to control the motion of the UAV and its onboard information acquisition equipment to acquire real time information as he desires. The system is useful in many applications, such as virtual tourism, disaster relief, search and rescue, and other commercial/personal purposes.

In one embodiment, the user or subscriber is able to remotely control and have FPV (first person view) of the UAV via a wireless network and internet. Instead of the direct radio link control used in today's UAV, the control signals are relayed from user's terminal device through a computer network such as Internet to the UAV which is probably thousands miles away. The user only needs to give out simple command such as 'move forward', 'get to a location marked by GPS coordinates", and 'lower altitude'. The operating software at the UAV will automatically execute the user command without the user providing further controlling details. The user is able to control the UAV to a desired location at desired altitude and speed. Further, the user is able to control the camera on the UAV to have the FPV of the site. The user may choose to zoom in and out or tilt the camera for desired viewing experience.

Further, the user may invite other people to be board on this virtual tourism system. For instance, the user may invite his relatives or friends from another continent to join him on the same tour. The users are able to share the same viewing experience by touring together. A software application connects all the users accessing the same drone in a social network environment where people can chat, text, sharing touring pictures and etc.

The software also allows the user to instantly switch from one drone to another drone, even the another drone is thousands miles away. The user gets real time video/audio/sensor experience through the UAV's camera, microphone and onboard sensors.

The system allows unlimited number of viewers to access the information relayed by the UAV. Typically only one person could control the UAV and its camera at one time to avoid conflict. This controlling ability is a limited resource that could be sold as a service by the operator of the system.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 6 is a schematic of the UAV system of FIG. 3 during use in accordance with the preferred embodiment;

FIG. 7 is a schematic of the UAV system of FIG. 3 during use in accordance with an alternative embodiment;

Figure 1:
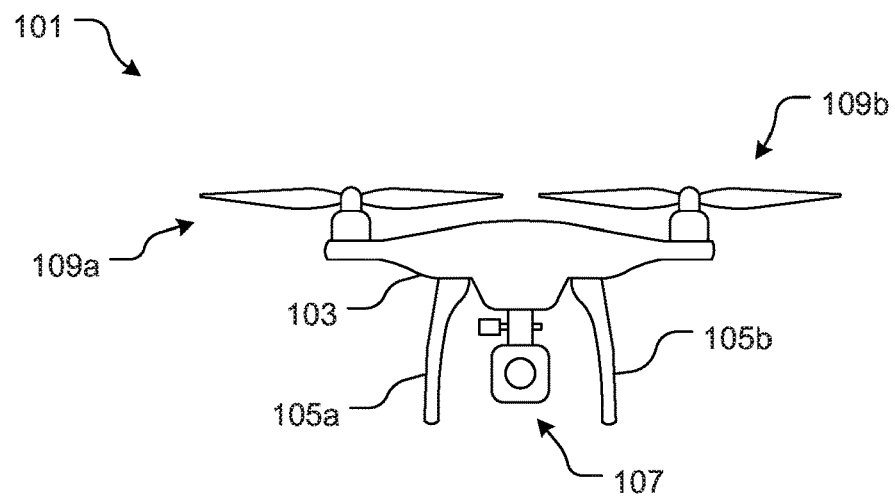
FIG. 1 is a front view of a conventional UAV.
Figure 2:
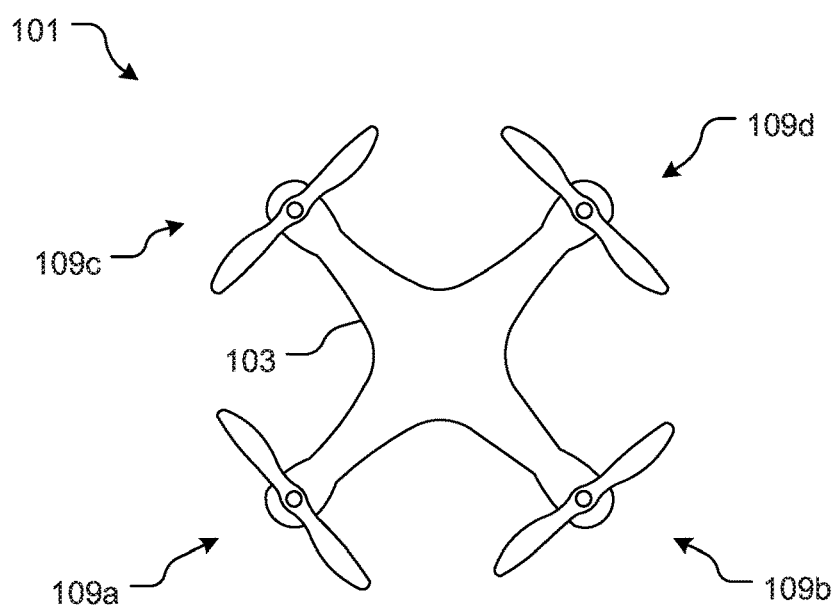
FIG. 2 is a top view of the UAV of FIG. 1.
Figure 3:
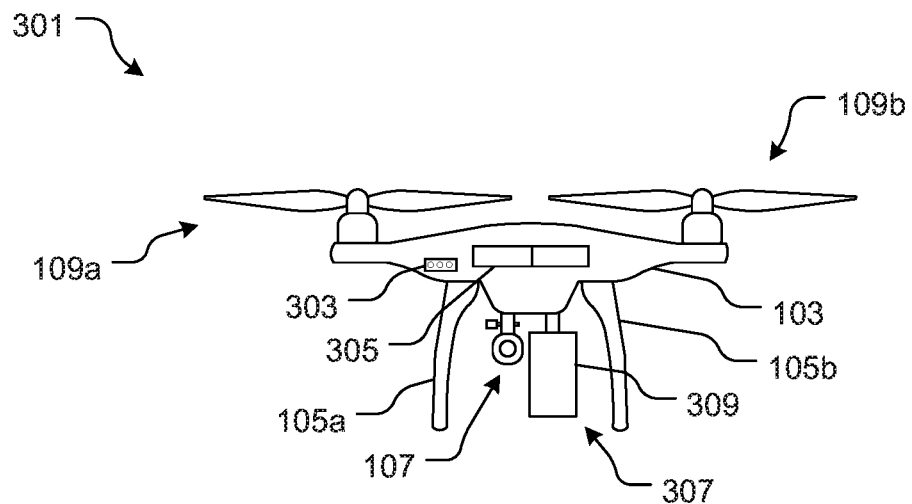
FIG. 3 is a front view of a UAV system and method of use in accordance with a preferred embodiment of the present application.
Figure 4:
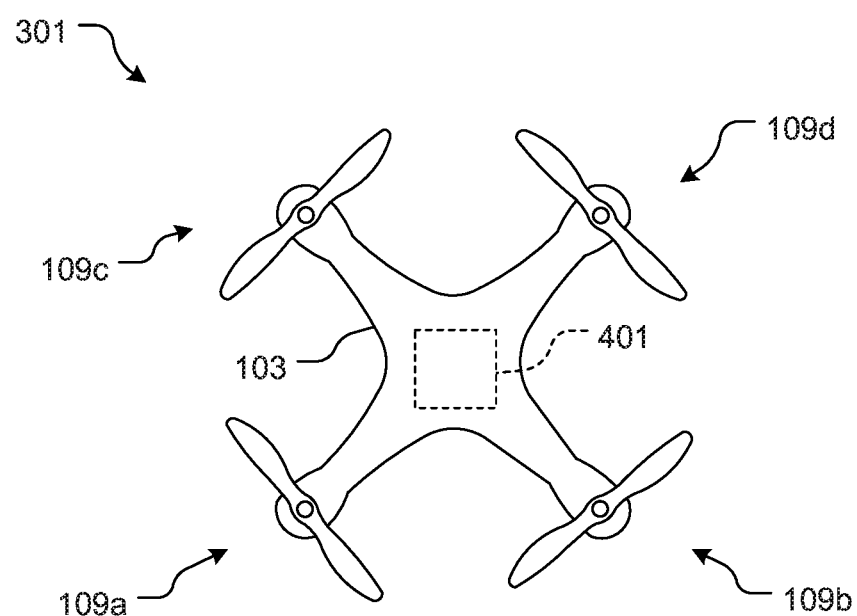
FIG. 4 is a top view of the UAV system of FIG. 3.
Figure 5:
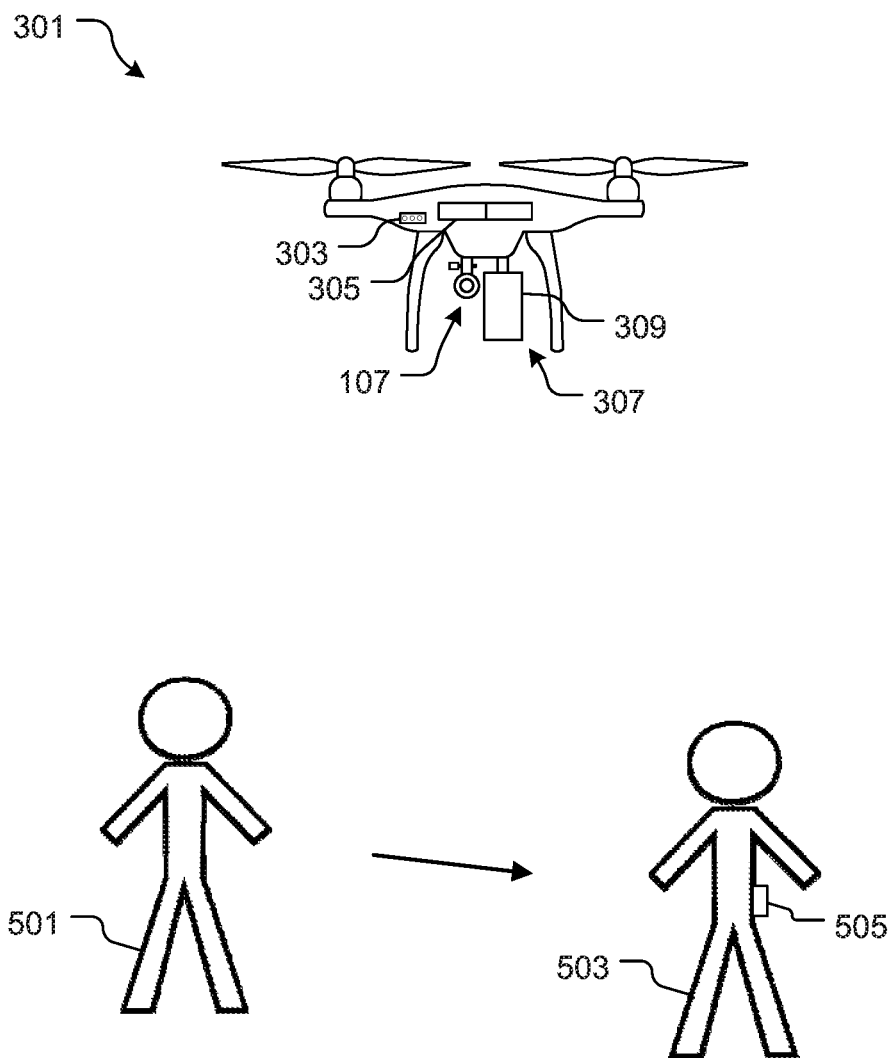
FIG. 5 is a schematic of the UAV system of FIG. 3 during use.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional UAV systems. Specifically, the system and method of the present application provides rapid and effective means to assist the user with means for protection. The alternative embodiment includes the features of allowing the user and other third parties the ability to view sights simultaneously from a distance. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 3-9 depict various views of the UAV system 301 and method of use in accordance with a preferred embodiment of the present application. It will be appreciated that system 301 overcomes one of more of the above-listed problems commonly associated with the conventional UAV aircrafts.

In the contemplated embodiment, system 301 includes one or more of the features of a conventional UAV 101. However, in the preferred embodiment, system 301 further includes a control system 401 disposed within the body 103 and operably associated with a speaker 303, a flashing light 305 and a deterrent device 307 having a housing 309 configured to contain either a net 601 (see FIG. 6) or a liquid spray 701 (see FIG. 7).

During use, the UAV system 301 maneuvers similar to a conventional UAV 101, but includes the features of deterring third parties 501 from harming the user 503. Such features are found in FIG. 5, wherein the user 503 carries a portable communication device 505, e.g. a tag or cellphone, configured to activate and notify the UAV of potential harm. Accordingly, the UAV system 301 is configured to serve as a personal guard to the user 503.

In one embodiment, the UAV is configured to autonomously fly to the user 503 upon activation of the device 505 and drops a net 601 over the third party 501 or to spray the third party 501 with a liquid spray such as pepper spray. The liquid is usually pressurized for easy spray. Accordingly, the deterrent device 307 is an effective means to prevent harm to the user 503. It will be appreciated that the system 301 could carry different type of deterrent means within housing 309 in alternative embodiment and should not be narrowly tailored to include solely a net or a pressurized liquid.

It will also be appreciated that system 301 includes one or more alternative means to deter the third party 501 from causing harm to user 503. For example, system 301 is provided with a speaker 303 which could be adapted to sound a siren and/or other audible alerts. The system 301 is further provided with a plurality of flashing lights 305 that could be utilized to illuminate the area with a flood light and/or scare the third party 501 with flashing blue and red lights. The system 301 is also provided with a camera device 107 configured to capture images of the scene during confrontation with the user 503.

In the preferred embodiment, the user 503 activates the communication device 505 to notify the UAV in the event of potential harm; however, it will be appreciated that that the features discussed herein could be adapted for use wherein the UAV is configured to scout areas where confrontations are possible. For example, the system could be utilized to scout a park at night and capture and deter third parties from harming others, e.g., a jogger.

Figure 8:
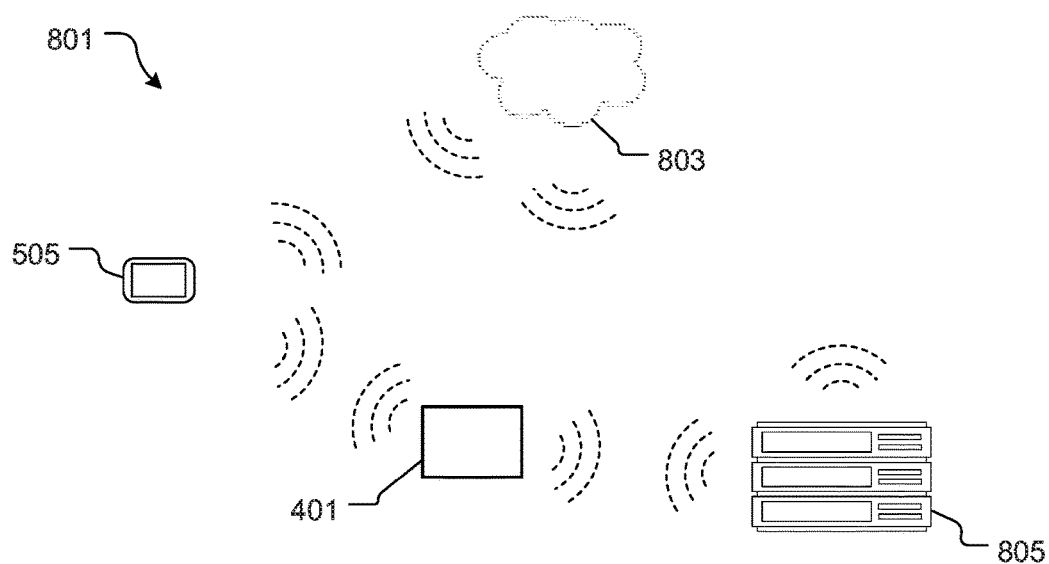
FIG. 8 is a schematic of a control system of the UAV system of FIG. 4.
Figure 9:
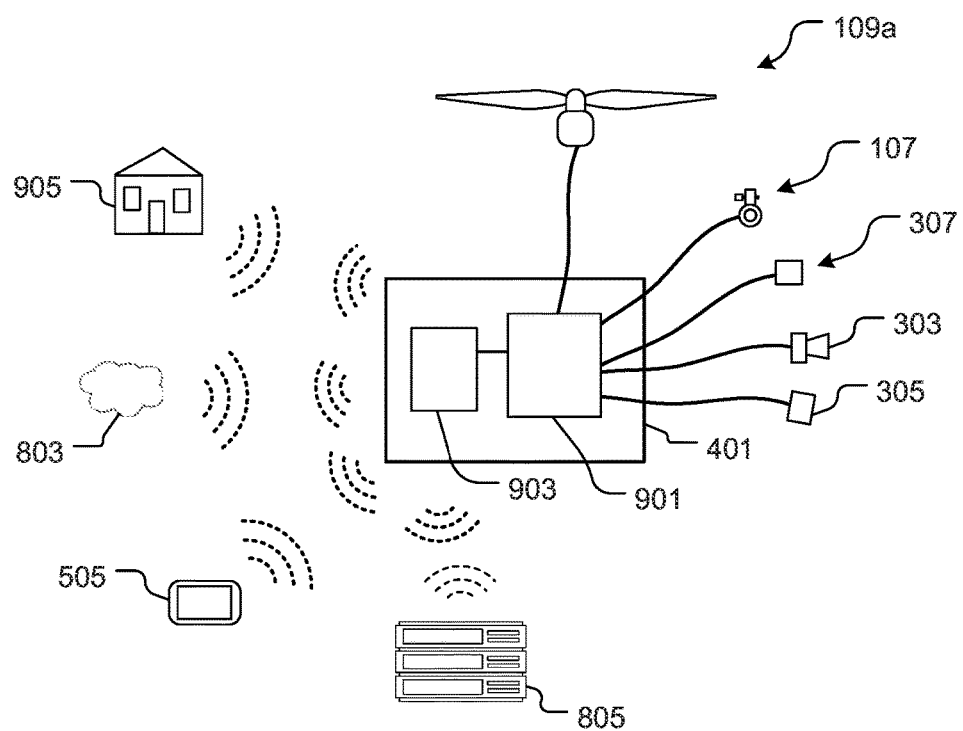
FIG. 9 is a schematic of the control system of FIG. 8 during use.

Referring now to FIGS. 8 and 9, schematics of the control system 401 during use are shown. In FIG. 8, it is contemplated having control system 401 and communication device 505 operably associated with a cloud service 803 and/or a server 805. Accordingly, the device 505 could communicate with the cloud service 803, e.g., an internet provider, which in turn communicates with the control system 401. Likewise, the control system 401 is adapted to wirelessly communicate with the central server 805, wherein captured videos could be stored. Further, the server 805 could also be adapted to control the aircraft during flight for autonomous flying.

In FIG. 9, the components operably associated with control system 401 are shown. In the preferred embodiment, the control system 401 includes a computer 901 operably associated with the devices discussed above in addition to be operably associated with a receiver 903 in communication with device 505, cloud service 803, server 805, and a police station 905.

In the contemplated embodiment, the system discussed herein could notify a police officer within the police station of the potential harm to the user. It is also contemplated having the receiver 903 notify other parties such as a friend, family member, and the like in addition to or in lieu of a police officer.

Figure 10:
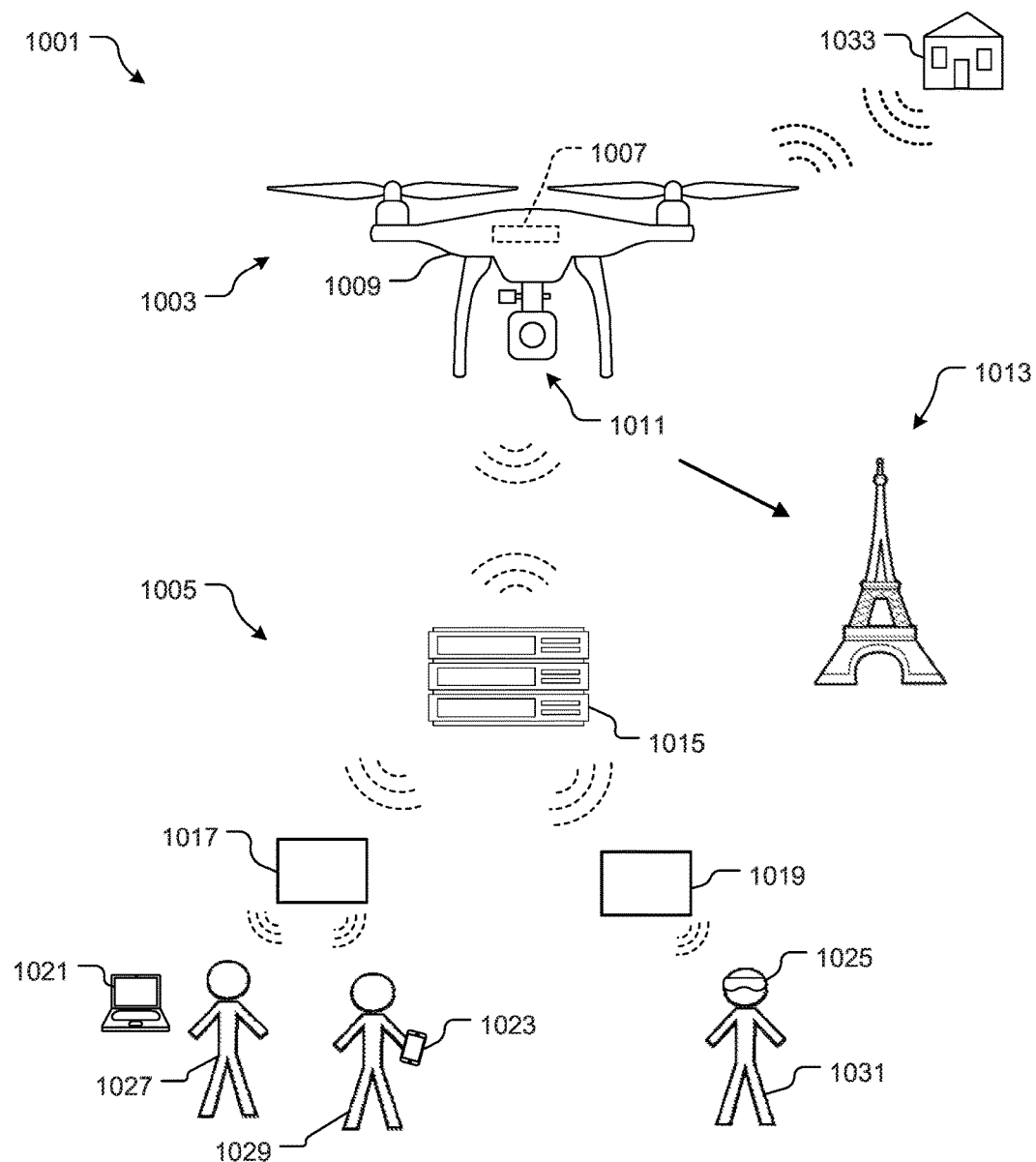
FIG. 10 is a schematic of a UAV system and method of use in accordance with an alternative embodiment of the present application.

Referring now to FIG. 10 in the drawings, an alternative embodiment of system 301 is shown. It will be appreciated that system 1001 is substantially similar in form and function to system 301 and includes one or more of the features discussed above. In the contemplated embodiment, the system 1001 includes one or more UAVs 1003 operably associated with a communication system 1005.

UAV 1003 is similar to UAV system 101 and includes one or more features discussed above, specifically, a control system 1007 disposed within a body 1009 and a camera device 1011 carried at a lower surface of the body 1009. The UAV could also include a microphone configured to capture sound. In the exemplary embodiment, system 1001 is utilized to capture video and images of a designation spot 1013 via camera device 1011 and a microphone. For example, the designated spot could include places such as the Eiffel tower, a disaster scene, real estate, military battle fields, sporting events, and so forth. The captured images and videos from camera device 1011 are relayed to a server 1015, which in turn are conveyed to one or more terminals 1017, 1019. It will be appreciated that server 1015 includes the necessary infrastructure to operate the UAV during use and to relay the captured data to one or more terminals operably associated with each user.

One of the unique features believed characteristic of system 1001 is that ability to capture and convey videos and images to one or more users 1027, 1029, and 1031 via respective computer 1021, smartphone 1023, and/or virtual reality eyewear 1025. Other display means for displaying the captured video, images, and/or sound are also contemplated in alternative embodiments. Accordingly, the users are able to view a designated spot 1013 via UAV 1003 at a remote location. It will be appreciated that the UAV, as well as the devices carried by the UAV such as the camera 1011, can be controlled via a command center 1033 or via a controller, e.g., computer 1021 or smartphone 1023.

There could be multiple camera devices 1011 that capture the site 1013 from different viewing angles. Software could process the multiple video images and transmit them to the viewing goggle 1025 to construct an immersive 3-D viewing experience.

Figure 11:
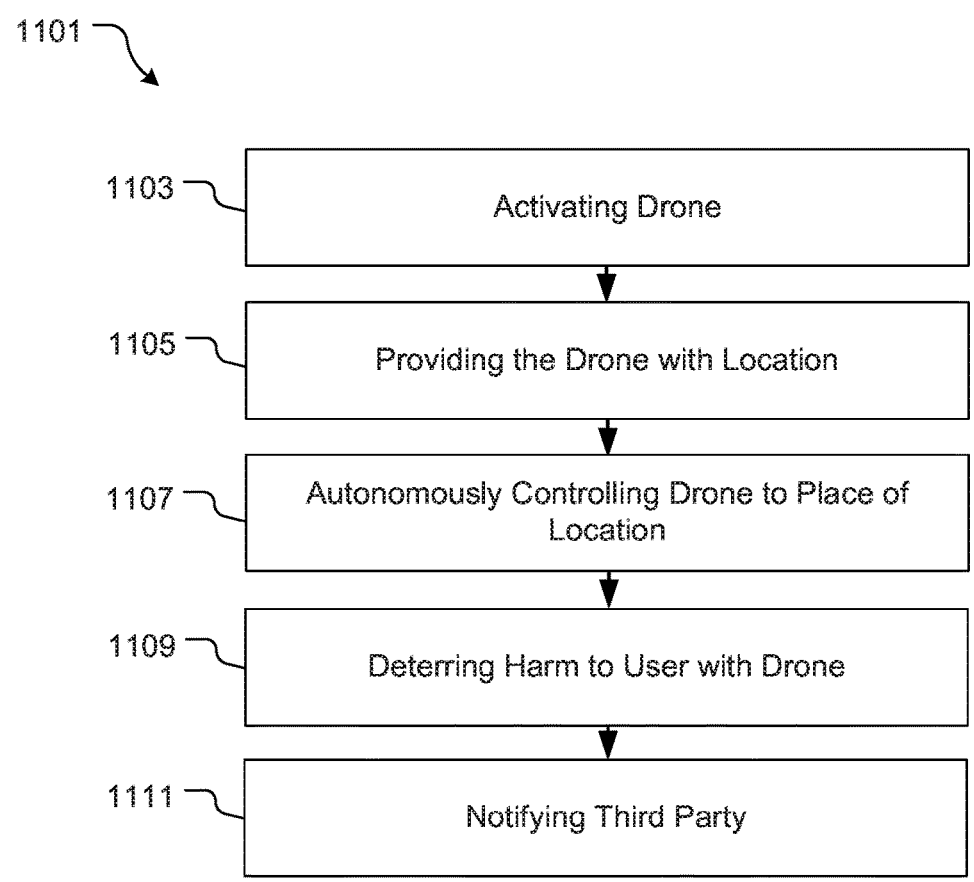
FIG. 11 is a flowchart of the method of use in accordance with the preferred embodiment.
Figure 12:
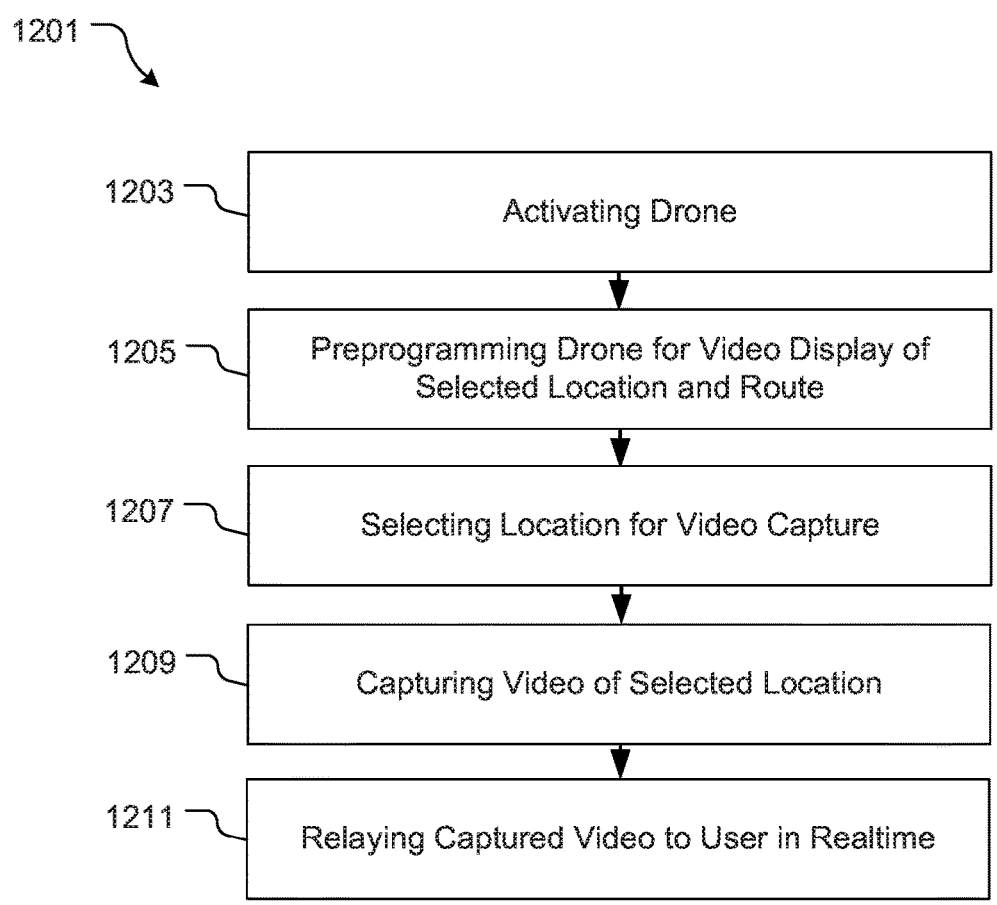
FIG. 12 is a flowchart of the method of use in accordance with the alternative embodiment.

Referring now to FIGS. 11 and 12, the method of use for respective systems 301, 1001 are depicted in flowcharts.

Flowchart 1101 illustrates the preferred method of use, which includes the process of activating the UAV via the communication device and/or other devices operably associated with controlling the flight of the UAV during use, as depicted in box 1103. The location of the user is provided to the UAV system and the UAV is autonomously controlled to the place of location, as depicted in boxes 1105, 1107. Upon arrival at the place of location, the UAV activates one or more deterrent devices, e.g., lights, sounds, spray, net, and the like, as depicted in box 1109. One option also includes notifying third parties, friends, family, police offices, and the like of the alert, as depicted in box 1111.

In the contemplate embodiment, a plurality of UAVs are placed on building tops, truck trailers, power poles and other places and organized in cells. Each UAV is responsible for a cell with certain radius for guaranteed arrival within the prescribed time after being dispatched. The cells are adjacent to each other in a honeycomb fashion, much like a traditional cellular base station layout.

Flowchart 1201 includes the method of the alternative embodiment. The steps include activating the UAV to capture images at a predetermined location, as depicted in boxes 1203, 1205. One or more users select the location for video capture and the UAV is thereafter instructed to capture the desired video and/or images of the selected location, as depicted in boxes 1207, 1209. The captured images are relayed to the users at a remote location from the selected location and displayed on virtual reality eyewear, as depicted in box 1211.

It will be appreciated that multiple UAVs can be utilized to capture images and videos of the selected location. Further the movement of the UAV and/or camera device can be controlled by the user in one contemplated embodiment. The user does not need to know how to control the UAV, he simply uses an intuitive input device such as a joy stick to indicate the direction of the UAV fight direction, and the complicated flight control is taken care of by the UAV flight control software. The user can pan out, zoom in, or tilt the onboard camera as a first person view (FPV). Either one of the VT view takes control of the UAV and camera, or everyone takes control in turn, while sharing all the virtual tourism experience via a social network. In addition, the software contemplated herein will allows the user could jump in and out of the UAV instantly without worrying crashing the UAV. The features discussed herein provide the user with a three-dimensional viewing of the selected locations via the virtual reality eyewear.

One or more UAVs (Unmanned Aerial Vehicles) may carry a payload of immobilization device, such as a net, a vehicle immobilization device such as tire spike, a device that generates a sound blast, or generates dazzling light, and other non-lethal weapons. The non-lethal weapon is also considered as a type of deterrent device or deterrent payload. The person (the "user") who controls the UAV is able to fly the UAV above the target and release or activate the immobilization device on the target with a remote control device.

In one of the embodiments, a UAV has an immobilization device, which is a net. The net is made of material strong enough to trap a person or a moving target such as an animal, or another airborne object such as an unfriendly UAV or an unfriendly aircraft. The user controls the direction, speed, and altitude of the UAV while patrolling an area or pursuing a target. Upon approaching the target at an appropriate distance and bearing relative to the target, the user or software may activate the immobilization device onboard the UAV. The appropriate distance should allow for accurate deploying of the immobilization device for effective immobilization. For instance, to immobilize a running target on the ground, the UAV might approach from the side, behind or front of the target. The immobilization device such as the net would be released from the UAV and extended to descend onto the target. The net would entangle the target's legs or other mobile parts to disable their movements, thereby immobilizing the target.

A net is an appropriate immobilization device for most airborne object, such as aircraft or another unfriendly UAV. Upon in contact with the exposed moving parts as rotary propellers or a jet turbine of that airborne object, the net would entangle the exposed moving parts and cause damage or failure of the airborne object. The resulting change of aero dynamic characteristics once the net is in contact with the target would also contribute to the object's inability of maintaining air worthiness.

A net is also effective in stopping or disabling a moving object such as human or animal. The net would trap, confuse, and entangle legs and ultimately stop that moving human or animal.

Further, the fabric of the net may be coated with a sticky adhesive such as glue to decrease the mobility of the target once the target is in contact with the net. The coating may also contain certain coloring dyes to make marks on the target for future tracking.

Still another application is to cast the net around a sea-going vessel. The net may be formed of sufficiently strong material to be able to entangle moving parts of the vessel, such as its propellers and rudder.

In one embodiment, the net may be carried by a single UAV and released or deployed from above the target. In another embodiment, the net may be deployed in in a direction other than downward. For instance, the net may be deployed upward from the UAV for example by a spring or explosive device to entangle an airborne object above the UAV. In yet another embodiment, the net may be carried by multiple UAVs, and each UAV may fly in concert with respect to the other UAVs. This 'flying net' may be controlled remotely to access the target and effectuate an engagement. Further, the multiple UAVs may be carried by an aircraft or another UAV ('mother UAV') before the multiple UAVs fly by their own. The multiple UAVs may be released from the aircraft or the 'mother UAV' remotely at a predetermined distance from the target for deploying the immobilizing device.

In stopping a moving vehicle, the payload of the UAV may be tire spikes or caltrop. The UAV deploys the payload of tire spikes in front of the vehicle. The tire spikes would pierce the vehicle's tires and cause it to stop eventually. Similarly, if the caltrops are of appropriate size, it may be used to stop people from moving.

Another substance that may prevent an object from moving is lubricant or anti traction materials. The UAV carries a container of lubricant such as oil, grease or some other specially formulated lubricant. The UAV may spray the lubricant around a target so that the target is not able to move on the surface, which is covered by the lubricant due to drastically lowered surface friction.

Figure 13:
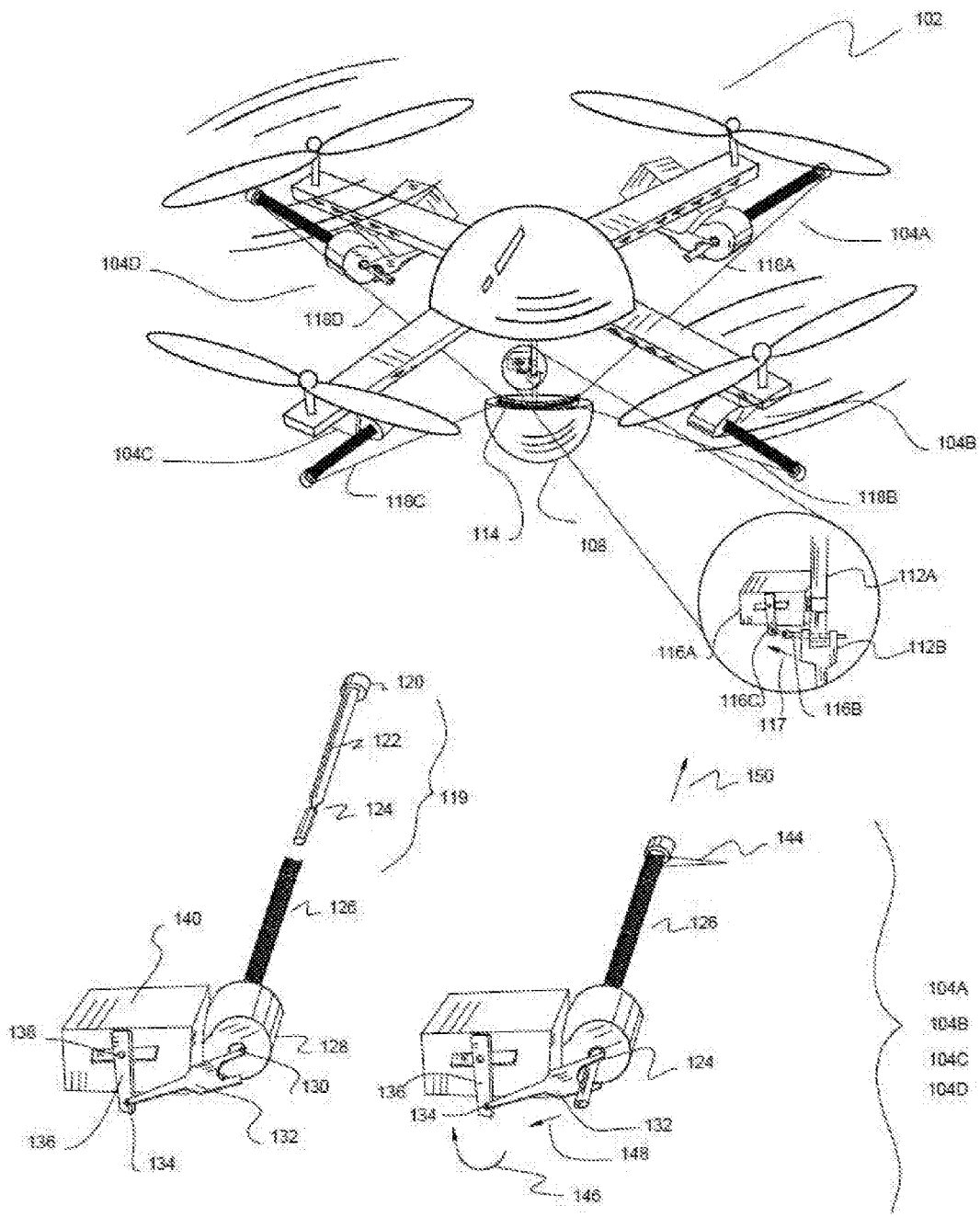
FIG. 13 depicts a simplified schematic of a UAV with net deployment mechanism, flashing light, speaker, microphone and camera in accordance with one embodiment of the present application.

FIG. 13 depict the UAV with a net deployment mechanism 102 which may be a quadcopter that carries the net and the net deployment mechanism. A projecting device 104A, 104B, 104C and 104D may be fastened to the four arms of the quadcopter 102, respectively.

The detail of the projecting device 104A, 104B, 104C and 104D is shown in the lower part of FIG. 13. The projectile 119 is spear shaped. It consists of a spring stopper 120, a body 122, and an indent 124 to engage trigger 132. The flat top indent 124 has a tapered cone and a flat top at the end of the thinner end of the cone. The projectile 119 may be inserted into the spring 126, and then into the hole 130, so that the trigger 132 can engage the flat top indent 124. The trigger 132 is connected with a pin 134 to the rotating arm 136 of a servo 140. The rotating arm 136 rotates around the axis 138 as shown in direction 146. When the spear shaped projectile 119 is engaged with the trigger 132, the spring 126 is compressed, which engages the flat top indent 124 against the trigger 132 and in turn against the projectile holder 128. The servo may be remotely controlled to move its arm 136 in the direction shown 146 around the axis 138. This movement activates the trigger 132 to move in direction 148, which disengages the trigger 132 from the projectile 119. The spring 126 expands, and as a result the projectile 119 may be released out in the direction as shown in 150.

The spring stopper 120 of the projectile 119 in the projecting assembly 104A, 1048, 104C and 104D retains a cord which may be a string 118A, 1188, 118C and 118D, respectively. The other ends of the cord 118A, 1188, 118C and 118D may be tied to four different places on the edges of a net 114. The net 114 may be retained in a bowl shaped container 108. A connecting shaft 11178 may be fastened to the bottom of the container 108 in the center. The end of the connecting shaft 11178 may be 'Y' shaped. Another connecting shaft 1117A may be fastened to the under frame of the drone 102, with one end cooperating with the 'Y' shaped end of the connecting shaft 11178. Holes may be formed in the joining ends of the connecting shafts 1117A and 1117B so that a pin 116B may be inserted all the way through to join the two connecting shafts 1117A and 1117B. The pin 116B may be connected to the rotating arm 116C of a servo 116A, which is fastened to the connecting shaft 1117A. The arm 116C may rotate by control which in turn engages the pin 116B to be urged in the direction shown in 117. This movement disengages the pin 116B from all the holes, and allows the container 108 to drop freely to the ground due to gravity.

Figure 14:
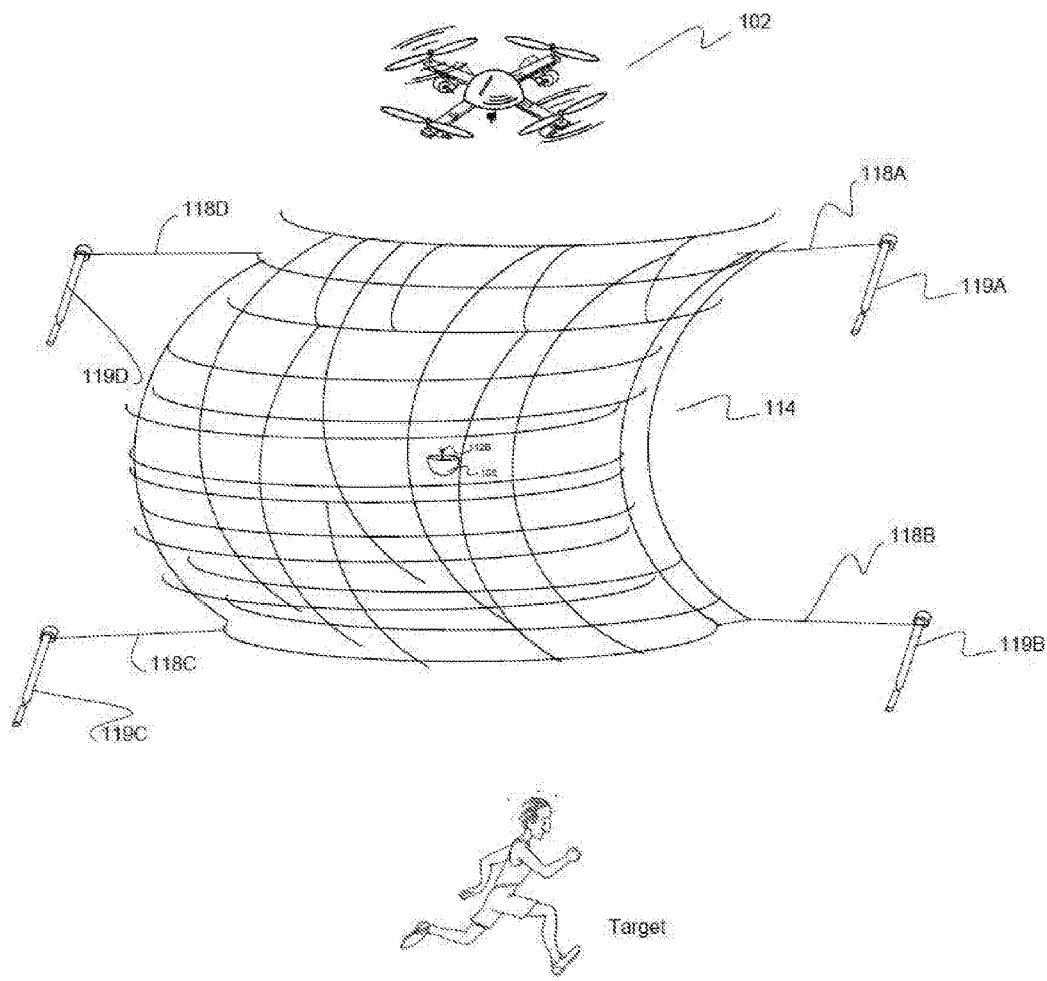
FIG. 14 depicts the net of FIG. 13 being deployed onto a moving target.

FIG. 14 depicts the net being deployed onto a moving target. The projectiles 119A, 119B, 119C and 119D are simultaneously projected out once a target is within shooting range. The connecting shaft 1117A and 1117B are disengaged at simultaneously by the movement of the pin 116B. The net 114 is deployed by the pulling of connecting strings 118A, 1188, 118C and 118D, and separated from the container 108.

It should be noted that there exist many other mechanisms to extend the net, such as compressed gas driven mechanism, firearm projectile trapping mechanism, differential deploy timing and others.

In the case of differential deployment timing mechanism, the projectile 119A, 1198, 119C and 119D may not require spring biasing but only a release mechanism from the drone. However the release of each projectile may not be simultaneous. For instance, the projectile 119A and 1198 may be separated from the drone first, and after a few seconds the projectile 119C and 119D are released. During that few seconds, because the drone, the 119C and 119D are in motion of differing directions, the net 114 is being extended by the free dropping of the projectile 119A and 1198 while a portion of the net 114 is still held fast by the projectile 119C and 119D. This effectively extends the net 114.

Figure 15:
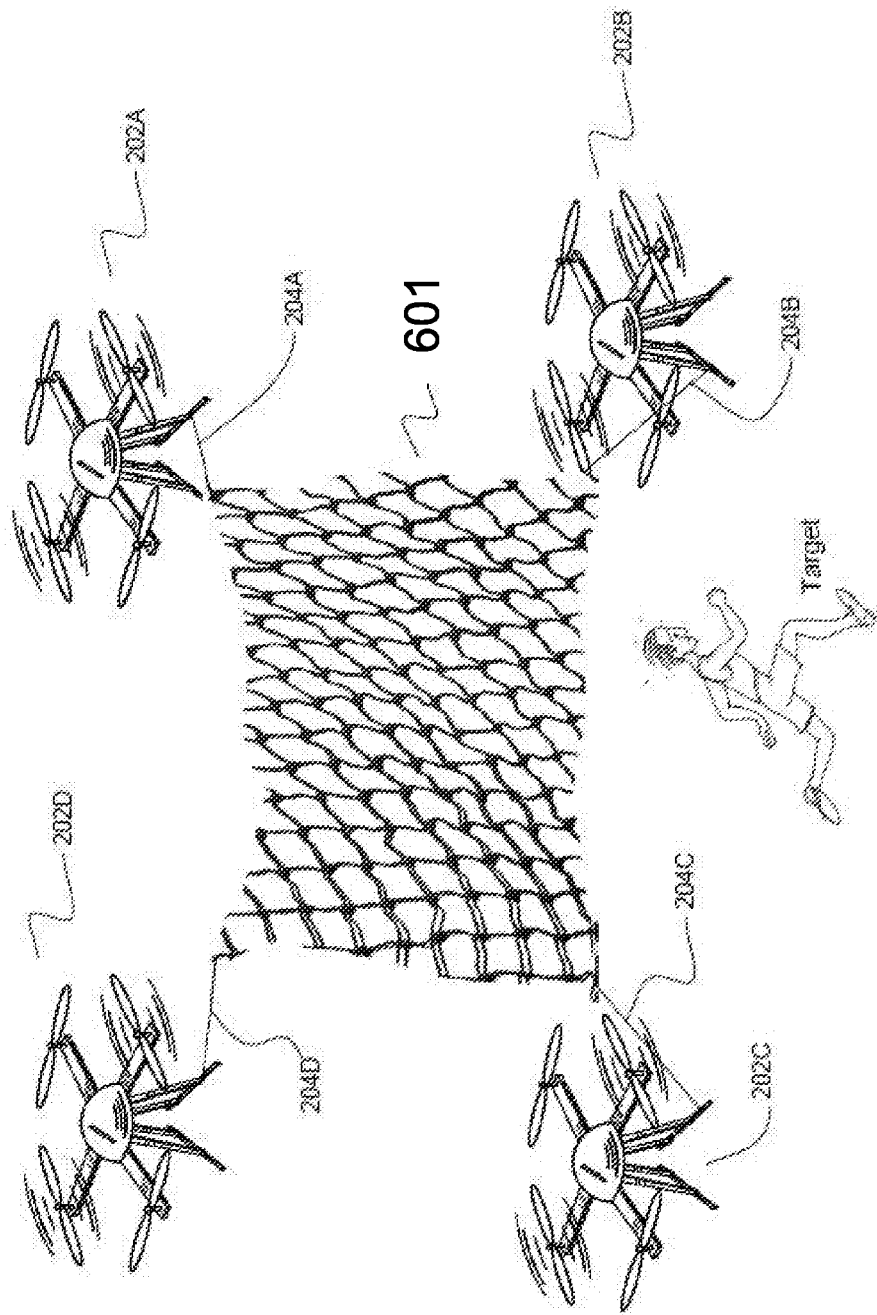
FIG. 15 depicts a net being carried by multiple UAVs in accordance with one embodiment of the present application.

FIG. 15 depicts a net being carried by multiple UAVs. UAVs 2017A, 2017B, 2017C and 2017D are connected to the edges of a net 601 through tethers 204A, 204B, 204C and 204D, respectively. The UAVs 2017A, 2017B, 2017C and 2017D are able to move in concert to approach a moving target for the purpose of entrapping the target with the net 601. Further, the UAVs 2017A, 2017B, 2017C and 2017D may be released from another airborne object, such as an aircraft, or another UAV ('mother UAV') that is not shown in this figure.

Figure 16:
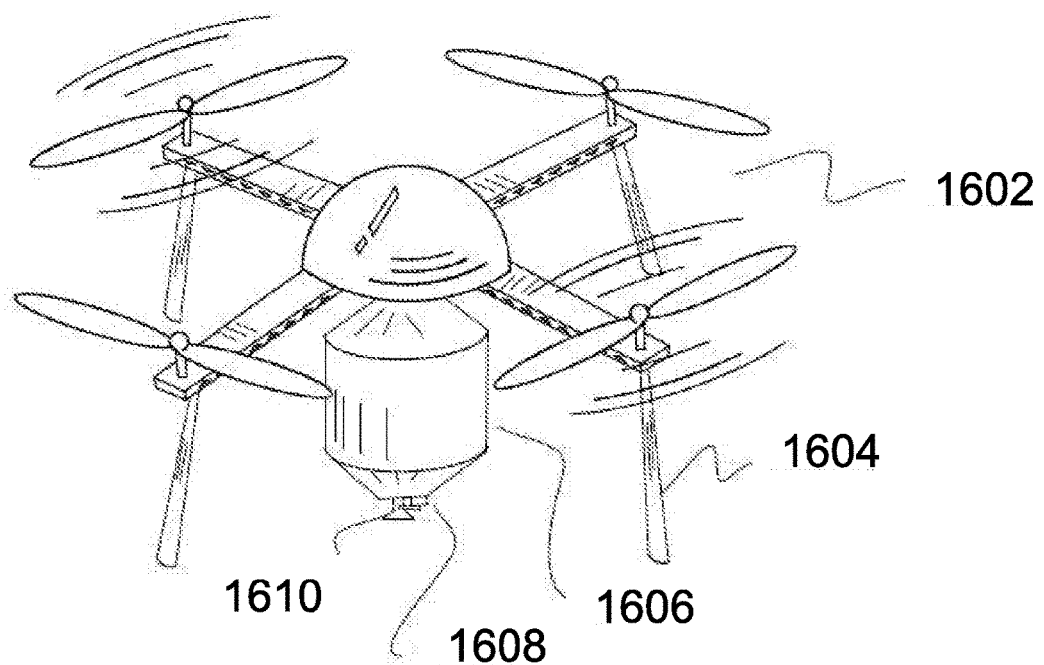
FIG. 16 depicts a UAV carrying lubricant liquid for spraying onto surfaces in accordance with one embodiment of the present application.

FIG. 16 depicts a UAV carrying lubricant liquid for spraying onto surfaces. There are some readily available Anti-traction materials in the market, which may be used, and some conventional lubricants may also be used such as oil-based liquid. A quadcopter UAV 1602 includes a container 1606 fastened to its lower frame. Landing gear 1604 is one of the landing gears of the copter 1602. A switch 1608 controls the opening 1610 of the container 1606. The switch 1608 may be remotely controlled to open the opening or spraying nozzle 1610. Inside the container 1606 is the lubricant liquid that can lower the friction coefficient of a surface onto which the liquid is applied.

Figure 17E:
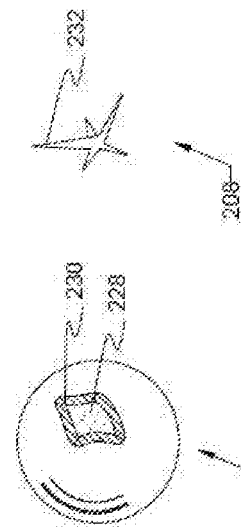
FIG. 17E depicts two types of immobilization devices, a spherical shell containing powder and a caltrop.
Figure 17B:
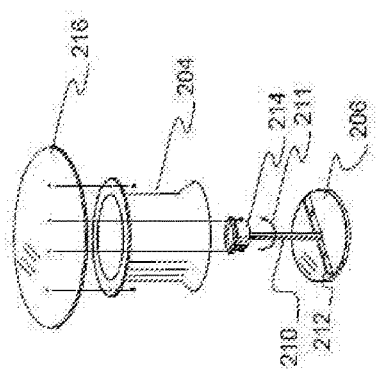
FIG. 17B depicts the explosive view of the immobilization device dispenser.
Figure 17D:
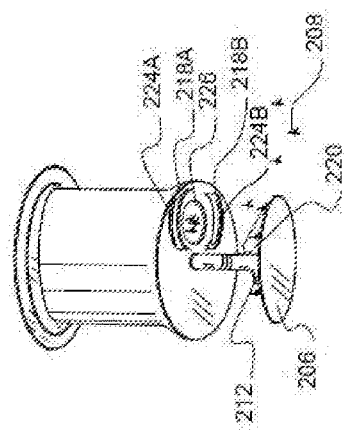
FIG. 17D depicts the perspective view of the immobilization device dispenser when the immobilization devices are being dispensed.
Figure 17A:
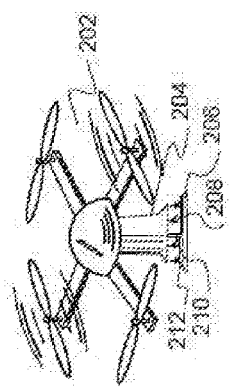
FIG. 17A depicts a UAV with an immobilization device dispenser.

FIG. 17A depicts a UAV with an immobilization device dispenser. The UAV 202 has a dispenser attached to its frame. The container 204 of the dispenser is fastened to the bottom of the UAV. The base 206 rotates under the rotation of a shaft 210. Immobilization devices 208 could be released from the container 204 and swept to the outside by the sweeping ridge 212 that is part of the base 206.

FIG. 17B depicts the explosive view of the immobilization device dispenser. The dispenser container 204 is fastened to the bottom frame 216 of the UAV shown in FIG. 17A. The base 206 is connected to a rotating shaft 210, which is able to rotate indicated by 211 caused by a motor 214. The motor 214 is fastened to the bottom frame 216 of the UAV. The sweeping ridge 212 causes the immobilization device to be swept at high speed out of the base 206.

Figure 17C:
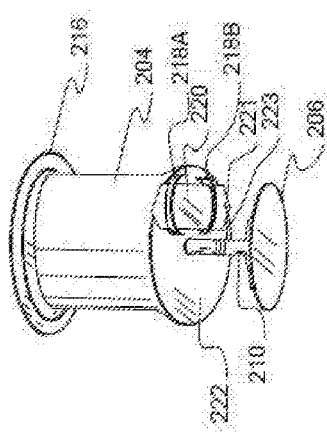
FIG. 17C depicts the perspective view of the immobilization device dispenser from the bottom up.

FIG. 17C depicts the perspective view of the immobilization device dispenser from bottom up angle. The container body 204 of the dispenser is fastened to the bottom frame 216 of the UAV shown in FIG. 17A. The bottom 222 of the container 204 has an opening which is covered by a stopper card 220. The stopper card is inserted into the slots of two card holders 218A and 218B. A thread 223 connects the stopper card 220 via a hole 221 to the rotating shaft 210. The rotation of the shaft 210 causes the stopper card 220 to be withdrawn from the slots on the card holders 218A and 218B, which expose the dispensing opening of the container 204.

FIG. 17D depicts the perspective view of the immobilization device dispenser when the immobilization devices are being dispensed. On the card holders 218A and 218B there are two slots 224A and 224B respectively to hold the stopper card 220. After the stopper card 220 is withdrawn, a dispensing opening 226 is exposed, which allows the immobilization devices 208 to be released. The rotation of the base 206 and the sweeping ridge 212 sweep the immobilization devices 208 to be distributed at high speed out of the dispenser.

FIG. 17E depicts two types of immobilization devices. 227 is a spherical shaped immobilization device. It is an exposed view of the device. The outer shell 230 is made by paper or thin plastics which opens upon impact. Inside is the substance 228 in powder form or liquid form. The substance 228 could be any riot control agents (RCA) or other chemicals, which cause temporary incapacitating of the target.

A caltrop 208 comprises multiple spikes 232. The caltrops when dispensed in sufficient numbers in an area would make that area impassable for humans as well as vehicles.

Figure 18B:
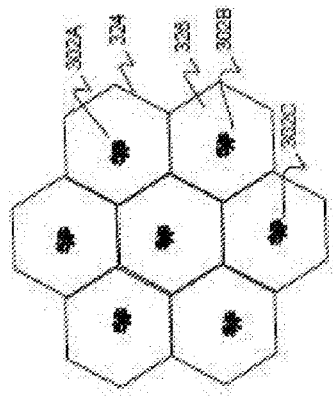
FIG. 18B depicts the spatial layout of the UAVs in a system
Figure 18A:
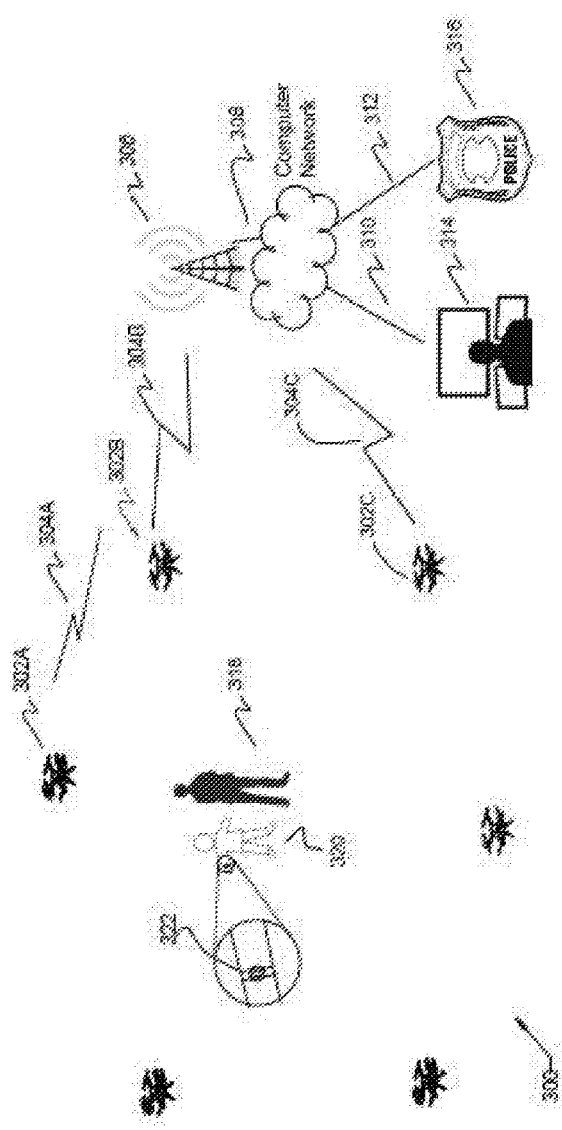
FIG. 18A depicts a schematic view of the emergency response UAV system.

FIG. 18A depicts a schematic of the emergency response UAV system. UAVs are geographically distributed to cover a service area. Each UAV is connected to a command center. For instance, UAVs 3017A, 3017B and 3017C are connected to a wireless base station 306 via wireless links 304A, 304B and 304C, respectively. The base station 306 is connected to a command center 314 via a computer network such as the Internet and communication links 308 and 310. The public safety authority 316 is also connected to the computer network via a communication link 312.

A user 320 is situated in the service area, wearing an emergency notification device 322. An attacker 318 is threatening the user 320. The user 320 presses a button on the emergency device 322 to send an emergency notification to the base station 306. Of course the emergency device could talk to any other close by base station as long as that base station could be connected to the command center 314.

FIG. 18B depicts the spatial layout of the UAVs in a system. Each UAV is responsible for an area or cell. For example, UAV 3017B covers cell 326. UAV 3017A and 3017C cover some other cells. The boundaries 324 has overlaps with adjacent cells' boundaries. Each cell has a shape resembling a hexagon. The overall shape looks like a honey comb and also resembles a typically wireless cellular base station layout.

Further the number of UAVs in a cell could be variable, dependent on actual historical statistics of needs for that cell. In addition, the area of the cell could be variable, again dependent on historical statistics of service needs. For instance, in high population density and high crime rate areas, the cell is smaller and requires more UAVs inside that cell. The maximum radius of a cell is determined by the prescribed response time and the speed of the UAV inside the cell. For example, if a prescribed response time is one minute and the UAV speed is 60 kilometers per hour, then the cell's radius should be less than 1 kilometer.

Figure 19:
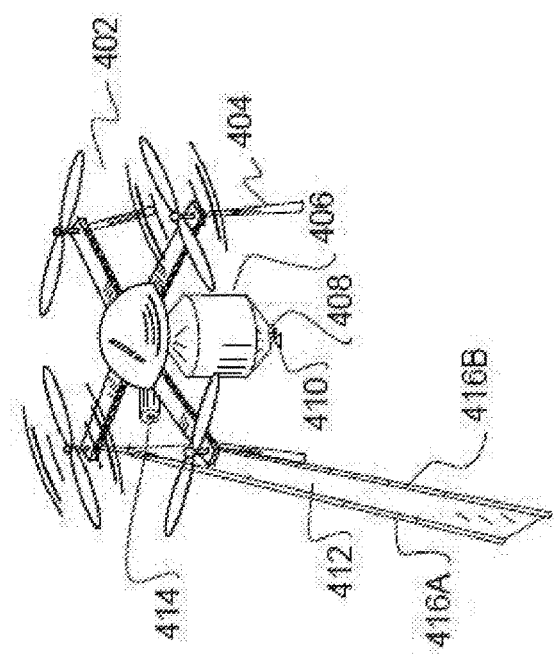
FIG. 19 depicts a liquid dispenser for spraying lubricant.

FIG. 19 depicts a liquid dispenser for spraying lubricant. The UAV 402 carries a container 406 which has a nozzle 410 at the bottom. It is controlled by a switch 408 for opening and shutting off. Landing gear 404 is used for safe take off and landing.

The UAV carries a screen 412 and a projector 414. The screen 412 is made of flexible sheet to reflect the light projected from the projector 414. The content displayed on the screen could be instructions for either the target or the user. For example, the screen could show the target that he is being surrounded by police in that area. The screen 412 may be rolled up while not used and released to form a flat surface while being used. The two side rail 416A and 416B are telescopic and can extend or contract. That motion will extend or contract the screen 412 as needed.

The lubricant could be oil based lubricant or other anti-friction material, designed to reduce surface friction after being sprayed on the road surface around the target. The target would have hard time moving due to the drastically reduced surface frictions. Therefore the target is less likely to be a threat or to be able to flee.

Figure 20:
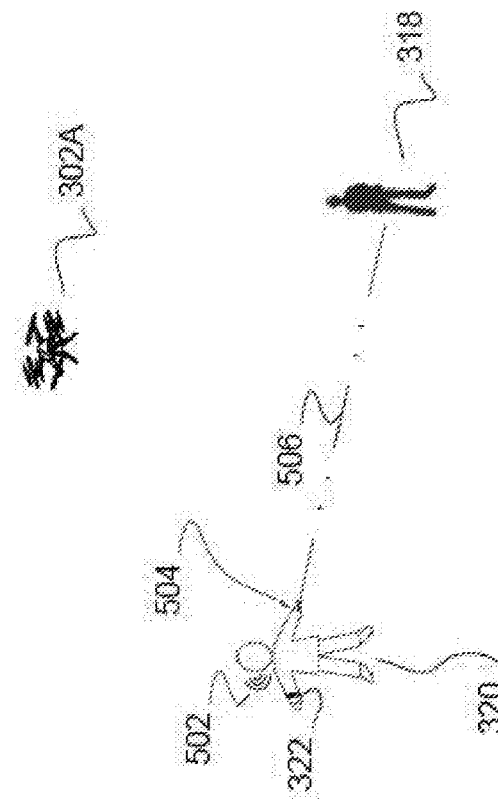
FIG. 20 depicts the interactions among the UAV, the user and the target

FIG. 20 depicts the interactions among the UAV, the user and the target. The user 320 also depicted in FIG. 18A is being attacked or threatened by the target 318. The user has used an emergency notification device 322 to have a UAV 3017A to fly over to rescue. The UAV 3017A is approaching the scene and can use its on board camera to take video shots of the situation. Other sensors such as microphones, thermal-imaging devices could also be used. There are many identification methods that could be used to make the UAV identify the target. Some are automatic and some need human intervention.

One identification method is for the camera on board the UAV to take video images of both of the target and the user. Image is further analyzed by the command center software or human staff to figure out the target identity and location. For instance, the user might use his or her arm or hand 504 as a gesture to point at the target. A line could be drawn from the direction of the pointing outward until it reaches another human being. After several images from different angles, all the lines drawn that way might converge to a single human being, which could be reasonably identified as the target.

Another method of identifying the target is to let the user 320 speak illustrated as 502 to the emergency notification device 322. The user describes the features of the target and that information is communicated to the command center Yet another way is to let the user point a laser beam at the target. A laser pointing component is embedded in some embodiments of the emergency notification device. The UAV could receive the reflection of the laser beam from the target surface thereby identify the target.

Yet another method is to use humans to monitor the video and determine the where and who the target is. The human could be the command center staff, public safety authority or online crowd sourcing method. In crow sourcing, the images are placed online for people to view. People familiar with the target may come forward with tips. All this could be done while the offense is still on-going. The user could also receive the video image or FPV on his or her mobile device. The user could direct the drone to carry out the neutralization steps.

The emergency device could also be triggered by another device or machine with sensors. For instance, a camera mounted outside a building or a parking lot could detect suspicious motions like vandalism activities and automatically send SOS request for a drone to come over and check out.

Another example is to detect arson. A thermal sensor is placed in an area. Whenever there is abnormal temperature rise, the thermal sensor sends a request to the UAV for it to investigate and stop possible arson.

Another example is to integrate home security monitoring system with the UAV response system. Once the security alarm is triggered by a home security system, a UAV is dispatched to the address of the home to check out.

Figure 21:
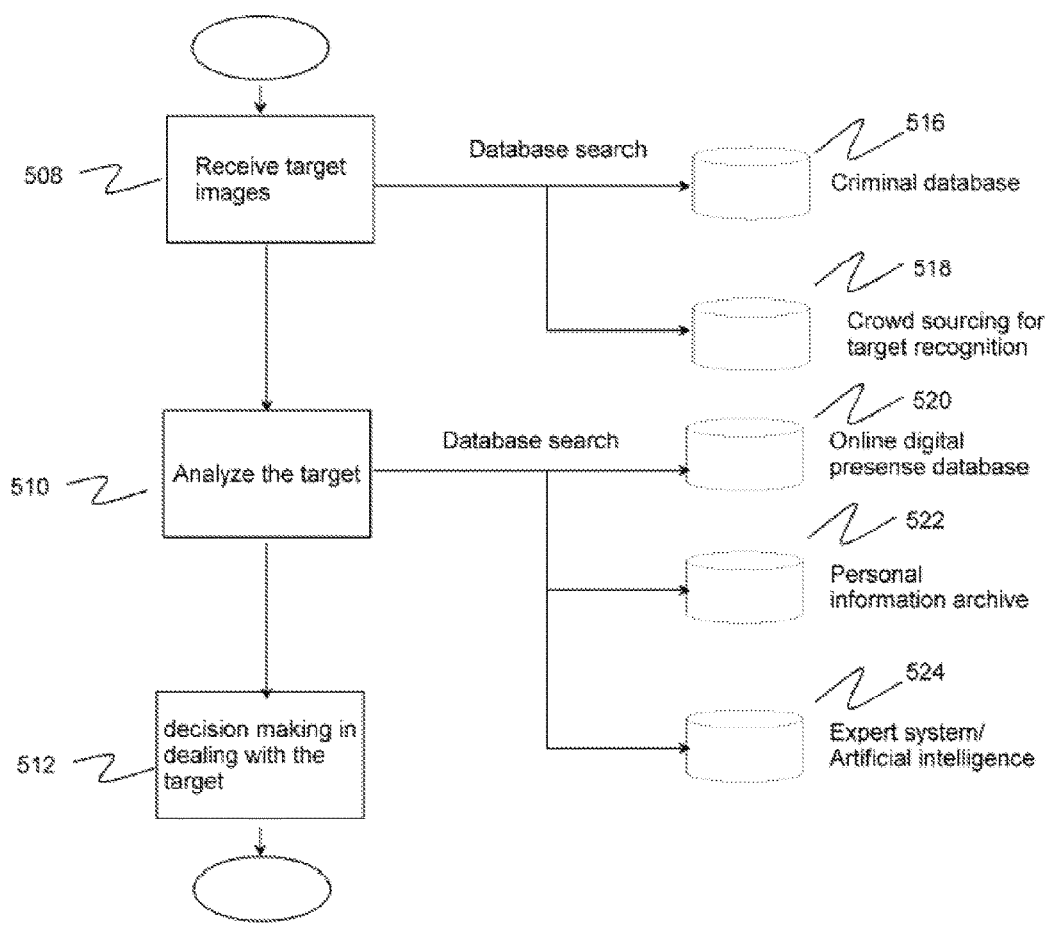
FIG. 21 depicts the engagement process with the target.

FIG. 21 depicts the engagement process with the target. The UAV's camera could take close shot of the face of the target. Facial recognition software coupled with a database could be used to further identify the target. The real time nature of identifying a target could be very valuable. The command center or the public safety authority could use this information to figure out the best way of stopping and apprehending the target. For instance, the speaker of the UAV could announce the name of the target, or could let the family of the target talk to the target on the scene. The target's vehicle could be also identified, which could be traced, analyzed and captured.

The onboard camera's images are sent back to the command center in step 508. The images of the face and body are used to search in national criminal database 516 to look for a match. Alternatively the images could be posted online for anyone with online access to contribute to the precise identification of the target. After the target is successfully identified, step 510 analyzes the target by searching in various databases and sources such as the target's online digital presence database 520, the personal information archive 522 and expert system or artificial intelligence system 524. The goal is to come up with the best way to stop the attack and neutralize the target. For example, the target's vehicle might be linked and located nearby, and that information may allow the law enforcement to get to that vehicle. Another example is to locate the possible places the target may subsequent visit such as his home. The police may proactively seek out the target should he flee.

Step 512 is decision making in dealing with the target based on the intelligence gathering. The decision could be verbal communications tailored to that individual target or some immobilization plans based on the characteristics of the target.

Further, the real time emergency response could be sent via a computer network such as the Internet to broader audience. In certain instance, a subscriber to such viewing service is able to view the real time raw footage of the emergency situations. In certain instances, the viewers could help identify the perpetrator. The subscribers could pay for such viewing experience, be rewarded, or freely access such content. This could be the foundation of a business model for real time emergency scene sharing experience.

Figure 22:
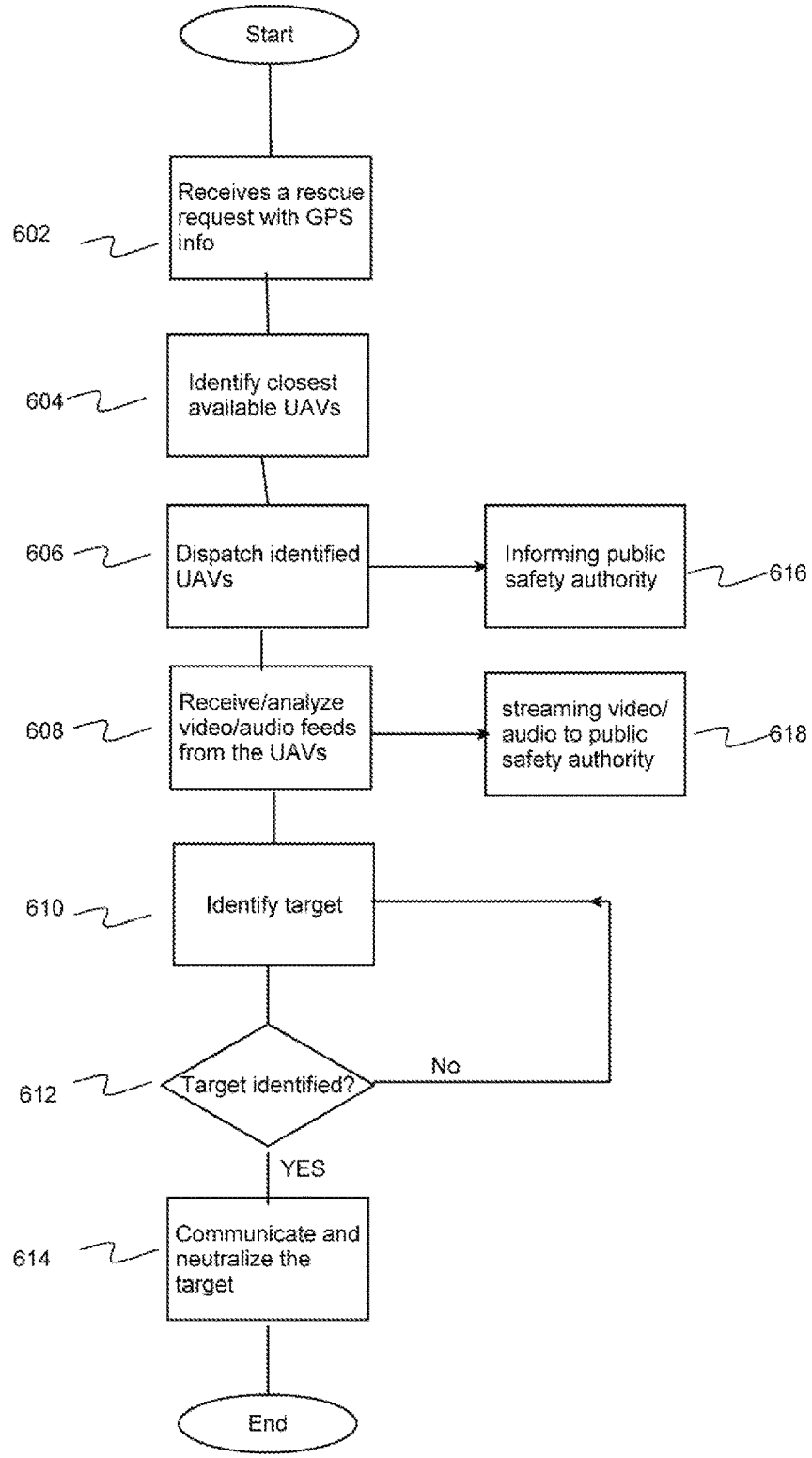
FIG. 22 depicts the processes of the command center for handling a typical emergency request.

FIG. 22 depicts the processes of the command center for handling a typical emergency request. The command center receives the rescue request and the GPS location of the request in step 602. With the location info, the command center identifies the UAVs to dispatch. The goal is to have UAVs arrive within the shortest amount of time. The UAVs are dispatched in step 606. Public safety authority is informed at the same time in step 616. The camera, microphone and other sensors on the UAVs start sending back the video and audio to the command center in 608. The video and audio are streamed to public safety authority in step 618.

The system attempts to identify the target in step 610 using multiple ways described in FIG. 20 and FIG. 21. The target's location is also identified. In step 614, the command center or the public safety authority initiates communication with the target via the speaker on the UAV or an optional video display on the UAV. The communication could address to the target by his identity, and demonstrate to the target that evidence has been collected, and continuation of the offense could not help anything. It could also inform the target that the only way out is to wait for the police to resolve the situation peacefully, along with other psychological strategies.

Figure 23:
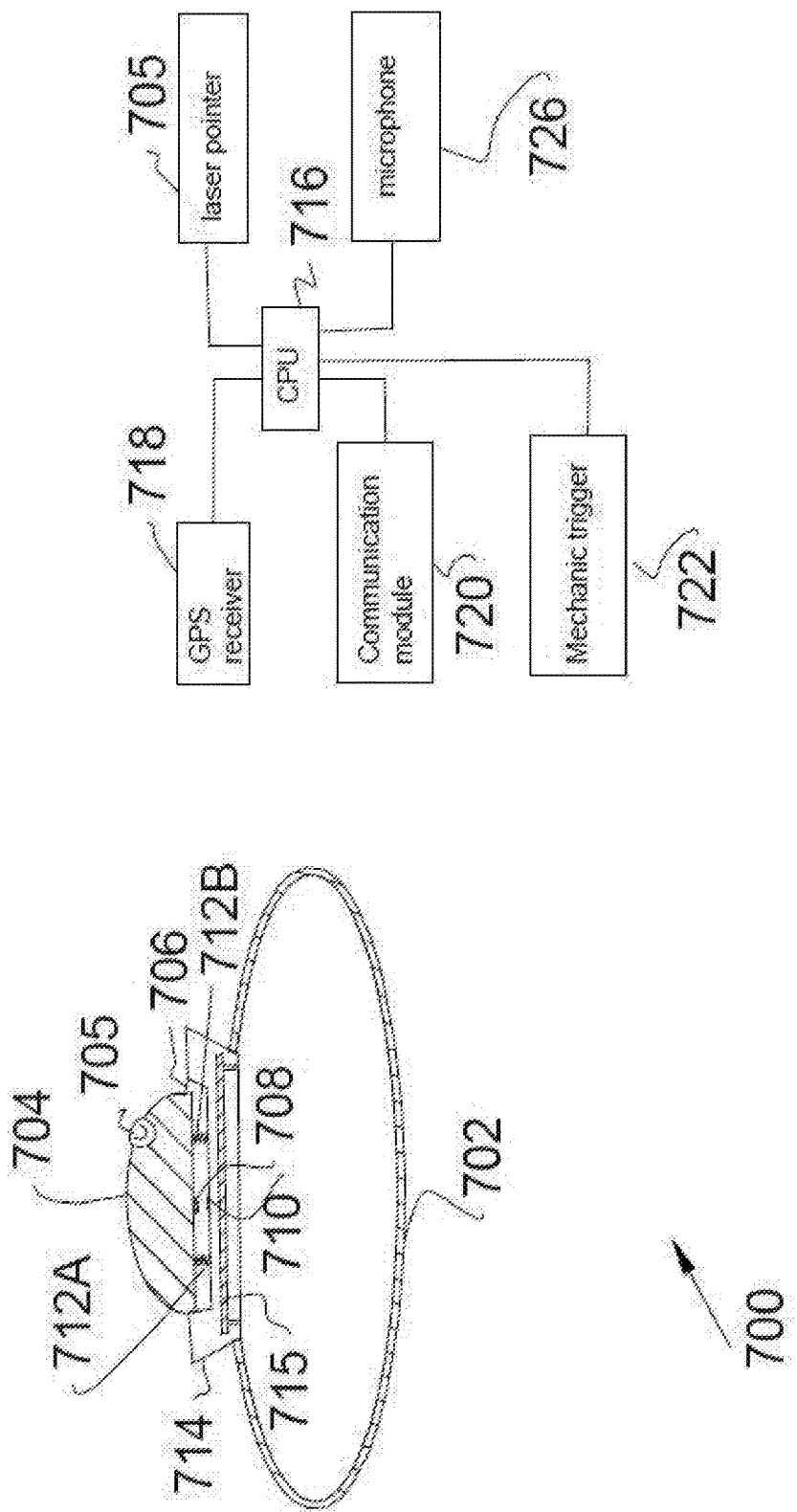
FIG. 23 depicts the emergency notification device structure and block diagram.

FIG. 23 depicts the emergency notification device structure and block diagram. 700 is the sectional view of the emergency device also shown as 322 in FIG. 18A. 702 is the band to be worn around wrist or other body parts. 704 is the button that sits on top of two springs 7117A and 7117B. Water proof rubber seal 706 prevents water invasion into the device. 708 and 710 are conductors connected to the button 712 and the base 714 respectively. Once the button 704 is depressed, the conductors 708 and 710 come into contact with each other and close a circuit to trigger emergency notification. Laser pointing window 705 emits a laser beam for indicating the target to the UAV. The user uses the laser beam to point at the target. The UAV is able to pick up the reflection of the laser from the target's body and identify the target.

Inside the casing of the base 714 is the hardware circuit board 715 of the device that is depicted on the right side of the FIG. 7. The mechanic trigger 722 refers to the trigger caused by the contact of conductors 708 and 710. The CPU 716 detects the trigger and starts sending out 'SOS' signal and the geo-location information collected from the GPS receiver 718 via the communication module 720. A microphone 726 is used to pick up the sound of the surrounding, also shown in 502 in FIG. 20.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system, comprising:
   an unmanned aerial vehicle, comprising:
      a body;
      a plurality of rotary assemblies secured to the body and configured to provide lift;
      a control system disposed within the body; and
      a device secured to the body and in data communication with the control system, the device is configured to carry a payload, the device is configured to release the payload upon command by the control system, the device having:
         an elongated container with an interior area configured to carry the payload therein, the elongated container having a lower surface with a hole and an opening extending therethrough;
         an elongated shaft configured to slidingly engage with and extend through the hole;
         a base secured to the elongated shaft and configured to cover the opening;
         wherein the payload passes through the opening; and
      a remote communication device in data communication with the control system, the remote communication device having a wireless transceiver, the wireless transceiver is in data communication with the control system of the unmanned aerial vehicle, the remote communication device is positioned at a location remote from the unmanned aerial vehicle;
   wherein the unmanned aerial vehicle is configured to autonomously fly to the location of the remote communication device upon activation of the remote communication device.

2. The system of claim 1, wherein the control system comprising:
   a transceiver in data communication with the wireless transceiver of the remote communication device.

3. The system of claim 2, wherein the transceiver is in data communication with a wireless receiver of a control command station.

4. The system of claim 1, further comprising:
   a light secured to the body and conductively coupled with the control system; and
   a speaker secured to the body and operably associated with the control system;
   wherein the light and the speaker are adapted to be used as a deterrence to a third party.

5. The system of claim 1, further comprising:
   a camera secured to the body and in data communication with the control system via the wireless transmitter.

6. The system of claim 5, wherein the camera captures and wirelessly transmits images to a server in data communication with the control system.

7. The system of claim 1, wherein a central command station is in data communication with the remote communication device and wherein the central command station is configured to activate and remotely control the unmanned aerial vehicle via the control system.

8. The system of claim 1, the remote communication device comprising:
   a global position tracking system in data communication with the control system.

9. The system of claim 1, wherein the remote communication device is a wireless phone.

10. The system of claim 1, wherein the device is a net.

11. The system of claim 10, further comprising:
a plurality of projecting devices secured to the body of the unmanned aerial vehicle; wherein the net is secured to the plurality of projecting devices.

12. The system of claim 11, further comprising:
a plurality of spring loaded projectiles engaged with the plurality of projecting devices and configured to secure the net to the unmanned aerial vehicles.

13. The system of claim 12, further comprising:
a plurality of triggers operably associated with the plurality of projecting devices; wherein the plurality of triggers are configured to release the plurality of spring loaded projectiles, which in turn releases the net from the unmanned aerial vehicle.

14. The system of claim 10, wherein the net is configured to engage with the third party.

15. The system of claim 1, wherein the device has a pressurized liquid.

16. A method, comprising:
providing the system of claim 1;
activating the unmanned aerial vehicle;
activating the remote communication device;
providing flight location to the unmanned aerial vehicle via the remote communication device; and
delivering the payload.

17. The method of claim 16, wherein the payload is a net.

\* \* \* \* \*